(12) United States Patent
Berger et al.

(10) Patent No.: US 11,470,197 B2
(45) Date of Patent: *Oct. 11, 2022

(54) SYSTEM AND METHOD FOR REPLACING HOLD-TIME WITH A CALL-BACK IN A CONTACT CENTER ENVIRONMENT

(71) Applicant: FonCloud, Inc., Toronto (CA)

(72) Inventors: Shai Berger, Tornoto (CA); Jason P. Bigue, Toronto (CA); Michael J. Pultz, Toronto (CA)

(73) Assignee: FonCloud, Inc., Toronto (CA)

( * ) Notice: Subject to any disclaimer, the term of this patent is extended or adjusted under 35 U.S.C. 154(b) by 5 days.

This patent is subject to a terminal disclaimer.

(21) Appl. No.: 16/405,263

(22) Filed: May 7, 2019

(65) Prior Publication Data
US 2019/0260878 A1   Aug. 22, 2019

Related U.S. Application Data

(60) Continuation of application No. 15/202,426, filed on Jul. 5, 2016, now Pat. No. 10,284,756, which is a division of application No. 14/299,014, filed on Jun. 9, 2014, now Pat. No. 9,386,151, which is a continuation-in-part of application No. 13/943,362, filed on Jul. 16, 2013, now Pat. No. 8,774,373, which is a continuation of application No. 12/400,932, filed on Mar. 10, 2009, now Pat. No. 8,515,028, application No. 14/299,014, which is a
(Continued)

(51) Int. Cl.
*H04M 3/523* (2006.01)
*H04M 3/428* (2006.01)
*H04M 3/493* (2006.01)
*H04M 3/42* (2006.01)
*H04M 7/00* (2006.01)
*H04L 9/40* (2022.01)

(52) U.S. Cl.
CPC ......... *H04M 3/5231* (2013.01); *H04M 3/428* (2013.01); *H04M 3/42059* (2013.01); *H04M 3/493* (2013.01); *H04M 7/0024* (2013.01); *H04L 63/0428* (2013.01); *H04M 2201/40* (2013.01); *H04M 2203/2077* (2013.01); *H04M 2203/60* (2013.01)

(58) Field of Classification Search
CPC ................ H04M 3/493; H04M 3/428; H04M 2203/2077; H04M 2201/40; H04L 63/0428
USPC ............ 379/210.01, 142.01, 142.02, 142.09, 379/210.02, 210.03, 211.01, 88.11, 88.13, 379/88.14, 93.17
See application file for complete search history.

(56) References Cited

U.S. PATENT DOCUMENTS

| | | | | |
|---|---|---|---|---|
| 5,742,675 A | * | 4/1998 | Kilander | H04M 3/5125 379/266.09 |
| 6,141,328 A | * | 10/2000 | Nabkel | H04M 3/428 370/259 |
| 2013/0054684 A1 | * | 2/2013 | Brazier | G06Q 10/02 709/203 |

* cited by examiner

*Primary Examiner* — Quynh H Nguyen
(74) *Attorney, Agent, or Firm* — Law Office of John Stattler

(57) ABSTRACT

System and method for handling a transaction between a waiting party and queuing party include an independent communication system (ICS) managing calls between the waiting party and calling party for handling sensitive data as well as call-attached data. The ICS manages the transaction in different stages and with different levels of sensitivity. Either party is allowed to modify the call or call preferences during the transaction. The ICS works independently from the queuing party calling system.

26 Claims, 16 Drawing Sheets

Related U.S. Application Data continuation-in-part of application No. 12/396,603, filed on Mar. 3, 2009, now Pat. No. 9,288,316, which is a continuation-in-part of application No. 12/276,621, filed on Nov. 24, 2008, now Pat. No. 9,270,817, application No. 13/943,362, which is a continuation of application No. 12/276,621, filed on Nov. 24, 2008, now Pat. No. 9,270,817, application No. 12/400,932, which is a continuation-in-part of application No. 12/276,621, filed on Nov. 24, 2008, now Pat. No. 9,270,817.

(60) Provisional application No. 61/035,204, filed on Mar. 10, 2008, provisional application No. 61/035,195, filed on Mar. 10, 2008, provisional application No. 61/033,856, filed on Mar. 5, 2008, provisional application No. 60/989,908, filed on Nov. 23, 2007.

SYSTEM AND METHOD FOR REPLACING HOLD-TIME WITH A CALL-BACK IN A CONTACT CENTER ENVIRONMENT

CROSS-REFERENCE TO RELATED APPLICATIONS

This application is a continuation of and claims priority to co-pending U.S. application Ser. No. 15/202,426, issuing as U.S. Pat. No. 10,284,726, which is a divisional application of and claims priority to US Application Serial No. 14/299,014, now U.S. Pat. No. 9,386,151, which itself is a continuation-in-part of U.S. application Ser. No. 13/943,362 having a filing date of Jul. 16, 2013, which itself is a continuation of U.S. application Ser. No. 12/400,932 having a filing date of Mar. 10, 2009, which itself claims priority from U.S. Provisional Patent Applications having Ser. Nos. 61/035,195 and 61/035,204, both filed Mar. 10, 2008 and is a Continuation-in-Part of U.S. Utility Patent Application Ser. No. 12/396,603, filed Mar. 3, 2009 which itself claims priority to Provisional Application Ser. No. 61/033,856, filed Mar. 5, 2008 and itself is a Continuation-in-Part of U.S. application Ser. No. 12/276,621 filed Nov. 24, 2008, which itself claims the benefit of U.S. Provisional Patent Application Ser. No. 60/989,908, filed Nov. 23, 2007, the disclosures of which are hereby incorporated by reference herein in their entireties and all commonly owned.

FIELD OF THE INVENTION

The present invention relates generally to communication call management and, more particularly, to call hold queuing in a contact center.

BACKGROUND

To better appreciate needs satisfied by the teachings of the present invention, consider a scenario where a person calls a company or organization, with the intent of having a conversation with a representative of that company or organization. It is very likely that this person (referred to here as the "Waiting party") will be put "on hold" to wait in queue before being connected to the representative (referred to here as the "Agent") for a real-time conversation.

Behind the scenes, the company or organization (referred to here as the "Queuing party") uses a communication system to maintain a queue of people waiting for an agent (the "Agent Queue"). This communication system is referred to herein as the "Queuing Communication System" or "QCS" and may be referred to in the industry as an "ACD" ("Automatic Call Distributor") or "Call Management System". The QCS 135 connects waiting parties to Agents in a "first in, first out" basis, similar to the way a physical queue of people works. The queuing party 130 may have multiple Agent Queues that connect to different types of Agents depending on the phone number called, the time of day, or other criteria. (The term "Queuing party" is used collectively to indicate the company or organization being called, and could also be referred to as "Holding party" which is different from the "On-Hold party".)

Being put on hold is frustrating for the waiting party 120 because he has to keep his phone connection active (which may result in additional telephony costs and may result in missing other calls) and because he has to keep listening to the audio of the call to hear when it is his turn to talk to the Agent. At the same time, putting callers on hold is detrimental to the queuing party 130 because it means many phone lines have to remain open (which may result in additional telephony costs) and it leads to unhappy callers (which can have detrimental effects on business goals).

According to the embodiments presented below, a better alternative to putting the waiting party 120 on hold is to give him the option for a call-back. That would work as follows:
1) The waiting party 120 is offered by the queuing party 130 the option of a call-back from an agent. This can be through an audio message that the waiting party 120 hears after dialing the queuing party 130, or it can be a visual message that the waiting party 120 sees on a website or mobile app. If he chooses that option he can give the system a Voice Address for the call-back (typically a phone number).
2) After making the request, the waiting party 120 does not have to be on the phone. He can make better use of his time while waiting for the call-back.
3) When the waiting party 120 turn arrives, he receives a call from the queuing party 130 and is connected to the Agent.

The approach outlined above is called "virtual queuing". A critical aspect of virtual queuing is that the waiting party place in the Agent Queue is maintained so that choosing a call-back does not result in a longer wait for the waiting party 120.

Over the years, a variety of prior art approaches have been proposed for virtual queuing including U.S. Pat. Nos. 5,436,967, 5,185,782, and 5,155,761. One flaw that all these approaches share is that they require customization of, modification to, or integration with the existing QCS. Since there is a large variety of hardware and software used for the QCS, this adds significant time and cost, which has hindered the wide-scale use of virtual queuing.

SUMMARY

Embodiments presented herein, by way of example, provide a system and method which allow a queuing Communication System (QCS) to be improved by adding virtual queuing functionality, by which it is meant that a waiting party 120 can choose to reach an agent by requesting a call-back rather than waiting on hold and can do so in a way that his request is processed by the QCS in a similar manner to calls typically received by the QCS.

Embodiments of the invention presented herein, by way of example, provide a system and method in a form of an Independent Communication System (ICS). The term "independent" is herein intended to mean that the ICS is not operated by the queuing party but rather by a third party service provider (e.g. a hosted contact center, telephony carrier, ILEC, or CLEC).

Further, embodiments presented herein provide such a system and method in a way that performs a call-back to the waiting party using a Call-back Voice Address, which can be a phone number, a VoIP address, a SIP address, a Skype address, or other communication or messaging address.

Further, embodiments presented herein provide such a system and method that maintains call-attached data (commonly known as CTI data, but could refer to any data collected during the call transaction), during the virtual queuing process.

Yet further, embodiments presented herein provide such a system and method by sending calls to and receiving calls from a cloud-based service, by which it is meant that no hardware or software needs to be installed locally to the QCS.

Further, embodiments presented herein provide such a system and method where the ICS communicates with the QCS in a way that any "sensitive data" is secured through encryption. In this case, "sensitive data" refers to any data going to or from the waiting party and including Media data (which includes audio, video, or DTMF tones) or Signaling Data or Call-Attached data. One goal of the encryption is that anyone intercepting data that travel between the ICS and QCS would not be able to extract any valuable information.

Further, embodiments presented herein provide such a system and method by sending calls to and receiving calls from the ICS via a Local Media Appliance (LMA), which is a hardware or software apparatus with a protected connection to the QCS. For example, the LMA and QCS could be on the same local network, or connected by secure VPN. The LMA sends and receives signaling and media data between the QCS and ICS (typically via the TCP or UDP protocols).

Embodiments presented herein provide such a system and method by sending calls to and receiving calls from the ICS using Voice over Internet Protocol (VoIP) via protocols such as SIP, H.323, RTP, etc.

Embodiments presented herein provide such a system and method by sending calls to and receiving calls from the ICS using Secure VoIP via protocols such as SIPS, SRTP, etc.

Embodiments presented herein provide such a system and method in a way that the waiting party has a visual interface (for example, on a computer or mobile device interface) that provides real-time feedback about the status of the call.

Embodiments presented herein is to provide such a system and method in a way that allows the collection of statistics (such as average hold time) and to report those statistics to the waiting party and the queuing party, or a third party.

Embodiments presented herein provide such a system and method in a way that allows the waiting party to schedule a call-back from the queuing party for a time range in the future, rather than as-soon-as-possible.

Embodiments presented herein provide such a system and method in a way that allows either party to modify the call, while virtual queuing is in progress. For example, the waiting party may change his call-back address, or cancel the request.

Yet further, embodiments presented herein provide such a system and method in a way that automatically selects a call-back address based on information stored about the waiting party.

BRIEF DESCRIPTION OF DRAWINGS

Embodiments of the invention are described by way of example with reference to the accompanying drawings in which.

DETAILED DESCRIPTION OF EMBODIMENTS

The present invention will now be described more fully hereinafter with reference to the accompanying drawings, in which embodiments of the invention are shown by way of illustration and example. This invention may, however, be embodied in many forms and should not be construed as limited to the embodiments set forth herein. Rather, these embodiments are provided so that this disclosure will be thorough and complete, and will fully convey the scope of the invention to those skilled in the art. Like numerals refer to like elements.

In carrying out the above objects, and other objects, the embodiments presented herein provide a system referred to as the Independent Communication System (ICS). The ICS 110 interoperates with a communication network (typically the PSTN or the public Internet) and with the queuing Communication System (QCS) of a particular queuing party 130 (typically a company or organization).

Atypical transaction comprises 6 phases: Sign-up, Confirmation, Queuing, Agent Prompt, Call-back, and Connection.

Phase 1: Sign-Up

Figure 1:
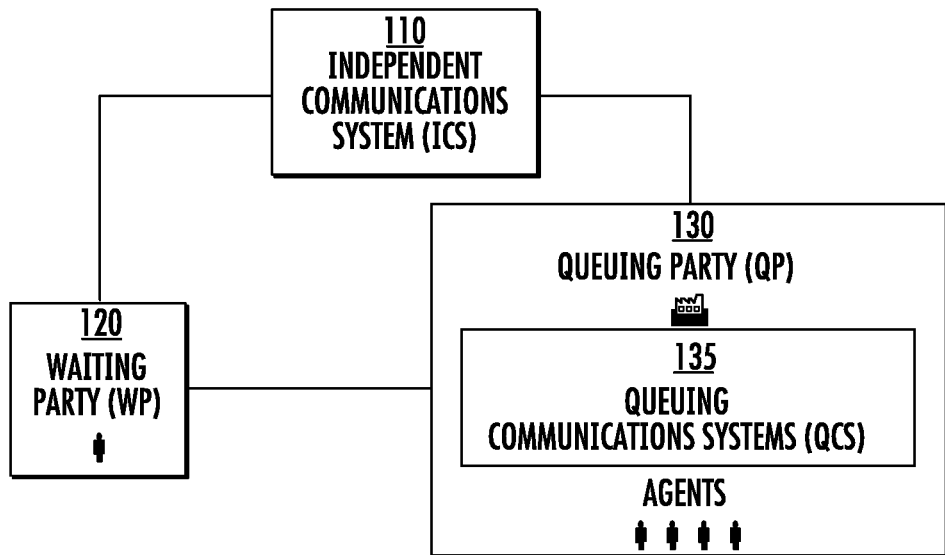
FIG. 1 is an exemplary representation of parties involved in virtual queuing with an ICS.
Figure 2:
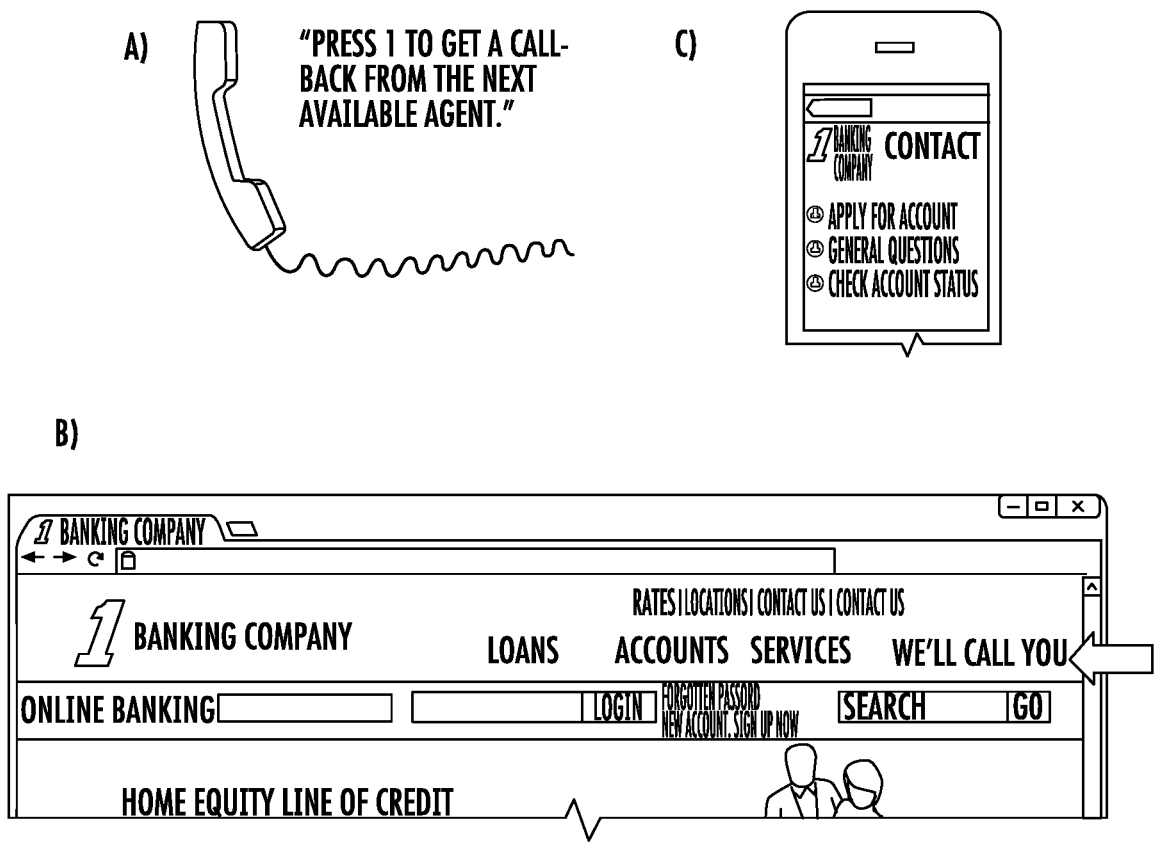
FIG. 2 is an exemplary representation of an interface for phase 1 (Sign-up) according to one embodiment.

Referring to FIG. 1, an independent communication system (ICS) 110 is between a waiting party 120 and a queuing party 130 having a queuing communications system (QCS). In the first phase of the transaction, the waiting party 120 chooses to receive a call-back rather than waiting on hold (i.e. he chooses virtual queuing). That choice can be made in different ways, depending on how the waiting party 120 interaction with the queuing party 130 begins. In some embodiments presented herein, the waiting party 120 will:

A) call the queuing party 130 first, hear an audio prompt from a phone system offering virtual queuing, and choose that option, while in other embodiments he will B) click a button on a web page (typically on the "Contact Us" page of the queuing party 130 website), while in other embodiments he will C) press a button on a mobile application. See FIG. 2.

Figure 3:
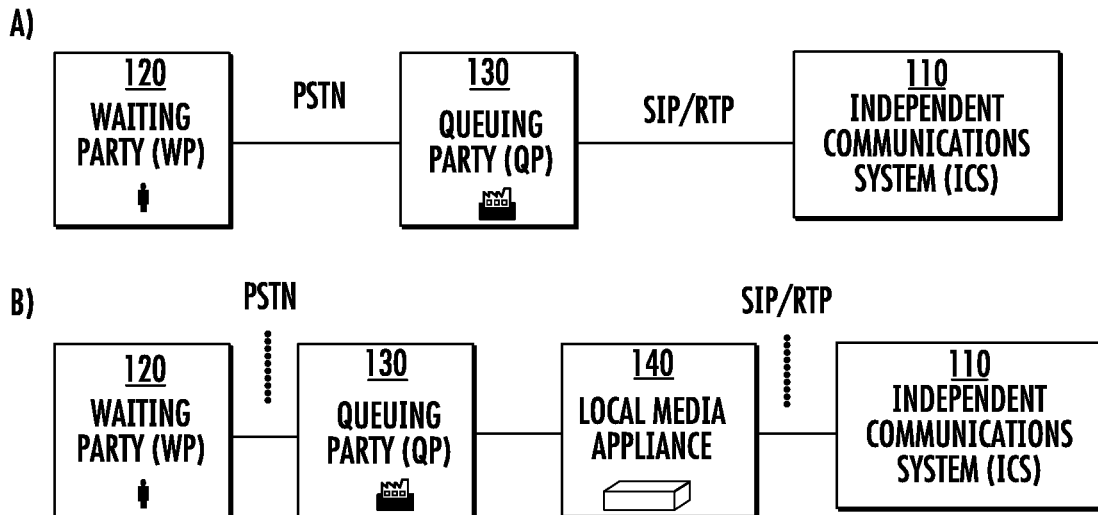
FIG. 3 is an exemplary representation of a connection diagram for phase 1 with In-Call sign-up according to one embodiment (SIP and RTP are used here as an illustrative example of a VoIP protocol)

Case "A" above is referred to as an "In-Call Sign-Up". In that case, the QCS 135 transfers the call that is in progress to the ICS. The transfer to the ICS 110 can be to a remote server over the public Internet (i.e. a "cloud" approach) or to a Local Media Appliance (LMA) 140 that is on a protected network with the ICS. The transfer can be made over the PSTN, or via a VoIP protocol over the network. See FIG. 3.

Because cases "B" and "C" above involve a visual interface, the waiting party 120 can view a menu that corresponds to the IVR options that would be encountered if the waiting party 120 had called the QCS 135 directly. In some embodiments, this "Visual IVR" is integrated with the visual interface used to request a call-back.

Phase 2: Confirmation

Figure 4:
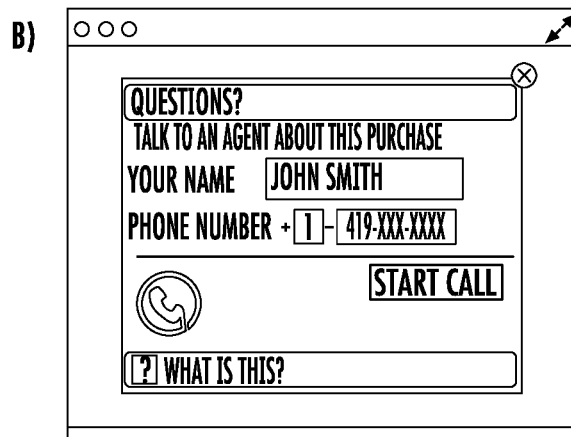
FIG. 4 is an exemplary representation of an Interface for phase 2 (Confirmation). A) Using just a phone call, 8) web interface, C) mobile interface according to one embodiment.
Figure 4:
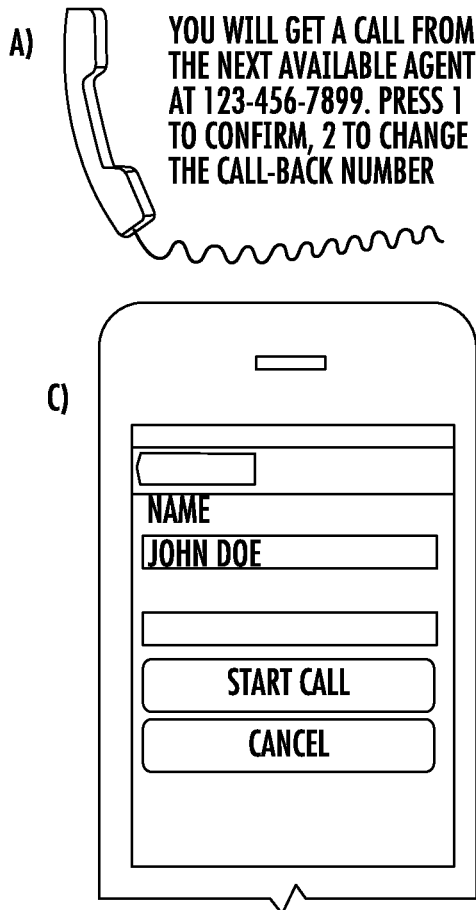

In the next phase, the ICS 110 interacts directly with the waiting party 120 to confirm that he wants a call-back and to collect the Voice Address for the call-back (the call-back address). In the case of In-Call Sign-Up, this confirmation is done via audio prompts using a phone system. In the case of web or mobile transactions, this confirmation is done using web or mobile visual interfaces, respectively. At this point, the waiting party 120 no longer has an active connection to either the ICS 110 or QCS. See FIG. 4.

In some embodiments, the call-back address is selected automatically based on information passed over the network (such as the ANI or VoIP information) and/or information that identifies the Data Device (such an IP address, Mobile Device ID, IMEI, or a browser cookie) and/or information about the waiting party 120 stored in a database accessible by the ICS 110 (such as the last call-back address used).

In some embodiments, additional information could also be automatically gathered from the waiting party 120 during this phase (e.g. geolocation data, contextual information, IP address, Mobile Device ID, IMEI, or a browser cookie).

In some embodiments, additional questions could be asked of the waiting party 120 (e.g. an ID number or a reference number).

Phase 3: Queuing

In this phase, the ICS 110 connects to the QCS 135 to wait in the Agent Queue on behalf of the waiting party 120 (The act of maintaining a position in the queue on behalf of someone is what makes this "virtual" queuing). The connection between the ICS 110 and QCS 135 at this stage is called the "Agent Leg". Note that the waiting party 120 is not involved during this stage.

Figure 5:
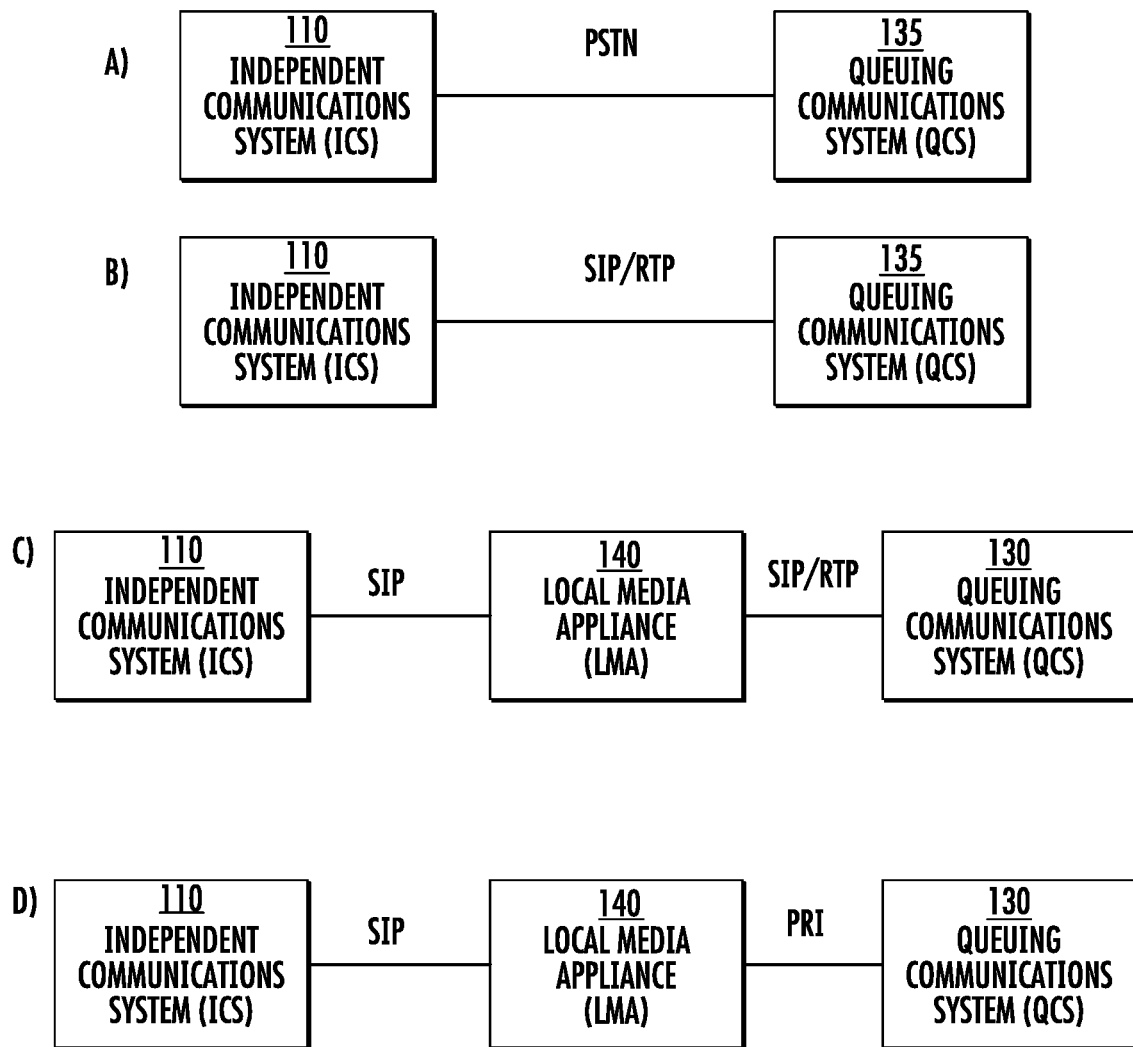
FIG. 5 is an exemplary representation of a connection diagram for phase 2/the agent leg according to one embodiment (SIP and RTP are used here as an illustrative example of a VoIP protocol)

Referring to FIG. 5, in some embodiments, the connection is:

A) a call through the PSTN, while in other embodiments it is,

B) a VoIP call which transits the public internet, or a heterogeneous network (e.g. leased line, L2/L2TP, VPN) while in other embodiments it is, C) a VoIP call from a local media appliance (LMA) that is on a protected network with the QCS, while in other embodiments it is, D) a direct data connection from a local media appliance (LMA) that is on a protected network with the QCS (e.g. via PRI, T1). See FIG. 5, by way of example.

In order to minimize the integration work with the QCS 135 (and maximize compatibility with different types of QCSs), the connection from ICS 110 to the QCS 135 should simulate as closely as possible a connection from the waiting party 120.

Figure 6:
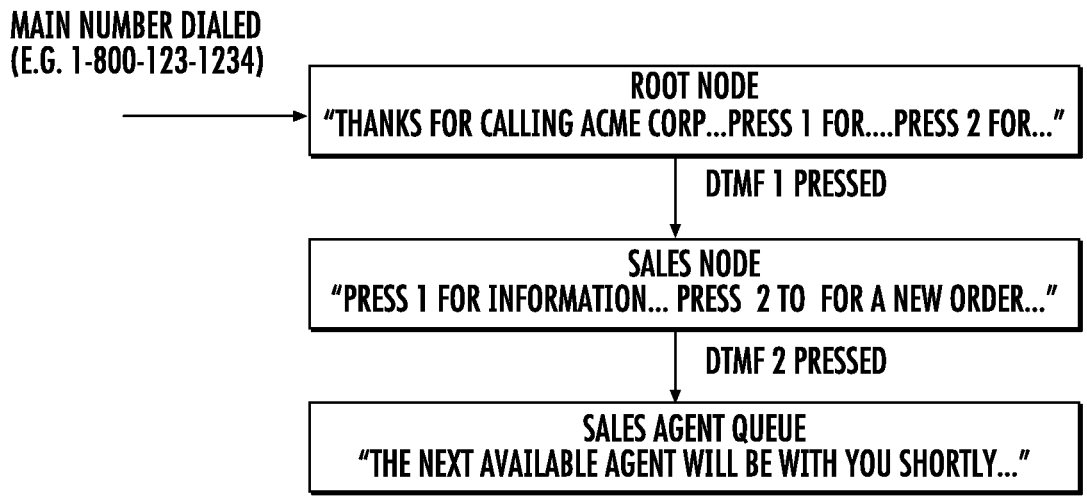
FIG. 6 is an exemplary representation of connecting to the right agent queue via an IVR according to one embodiment.

In some embodiments, this process may involve navigating an IVR that is part of the QCS 135 in order to get to the proper queue. This navigation can be done by the ICS 110 in an automated manner by sending DTMF tones or Voice Cues to the QCS. In some embodiments, the ICS 110 may perform this navigation using a map of the IVR. This navigation may involve using some of the information provided by the waiting party 120 during Phase 2 (e.g. an ID number). See FIG. 6.

Figure 7:
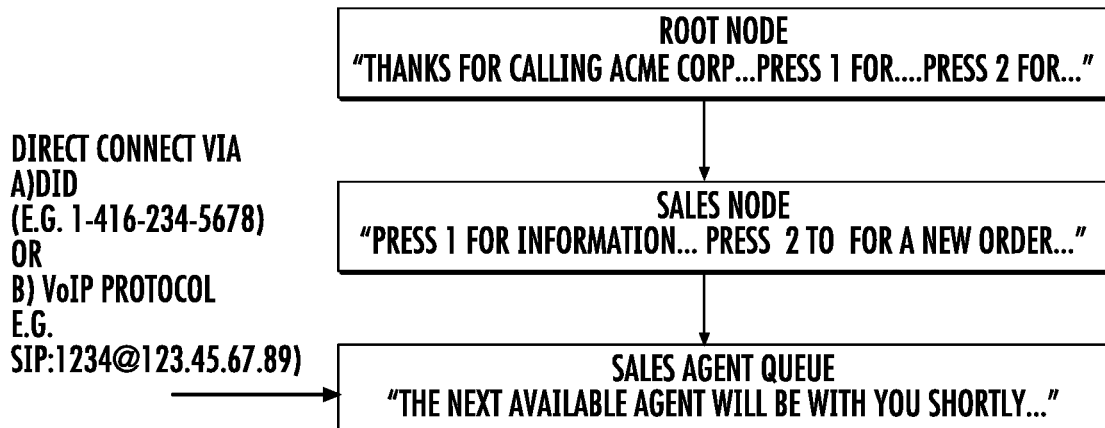
FIG. 7 is an exemplary representation of connecting to the right agent queue via A) DID or 8) SIP according to one embodiment, wherein SIP is used here as a non-limiting example of a VoIP protocol.

In some embodiments, the ICS 110 may instead connect to the AgentQueue directly, through a dedicated voice address (which can be a DID or SIP address) which is provided by the queuing party 130. See FIG. 7.

Phase 4: Agent Prompt

As time passes, the position held in the Agent Queue by the ICS 110 advances forward. When it reaches the front of the line, the Agent will answer the call. At this point, the ICS 110 must inform the agent that a waiting party 120 is being called back and will be connected soon. In some embodiments, this is done by playing an automated audio message, referred to here as the "Agent Prompt", for the Agent to hear. An example Agent Prompt might be "There is a customer waiting. Please stand-by."

In some embodiments, the ICS 110 can wait for an Agent Acknowledgement via a DTMF tone or voice command. In this case an example Agent Prompt might be "There is a customer waiting. Press 1 to connect."

In some embodiments, the ICS 110 can play an audio message (an "Agent Whisper") for the agent with information about the waiting party 120. An example message might be "There is a customer waiting. Case number is 1234. Please press 1 to connect."

In some embodiments, the ICS 110 detects the transition from the on-hold state to the live agent state by continually processing the audio and searching for certain cues.

In some embodiments, the ICS 110 detects the transition from the on-hold state to the live agent state by receiving VoIP signaling information from the QCS 135 (e.g. a SIP message).

Phase 5: Call-Back

During this phase the QCS 135 calls the waiting party 120 at the call-back address. This is referred to as the "Waiting party Leg".

The waiting party 120 Leg is initiated in some embodiments when:
A) The ICS 110 connects to the Agent, or in other embodiments when
B) The ICS 110 connects and either receives an Agent Acknowledgment or detects that the on-hold state has ended, or in other embodiments when
C) The QCS 135 sends a signal to the ICS 110 that the waiting party 120 in question is close to or at the end of the queue, or in other embodiments when
D) The ICS 110 estimates that the waiting party 120 in question is close to or at the end of the queue, based on information from the QCS 135 or based on past statistics.

Cases A and B above are examples of "Agent First Call-back" where the Agent is notified first (via the Agent Prompt) and then (typically after an Agent Acknowledgement) the waiting party 120 is called and connected. The Agent must wait until the waiting party 120 answers.

Cases C and D above are examples of "Waiting party First Call-Back". The waiting party 120 is called and then hears a waiting party Prompt (e.g. "We are connecting you to an agent. Please stand-by."). The waiting party 120 must wait until the Agent answers.

If the Call-Back Number is a PSTN phone number then, in some embodiments, this call will be initiated from the ICS 110 as:
A) a PSTN call, using the ICS's connection to the PSTN, or in other embodiments as
B) a VoIP call, sent to the QCS 135 and then to the PSTN using the QCS's normal outbound dialing infrastructure, or in other embodiments as
C) a software command to a Local Media Appliance (LMA) which can then connect to the QCS 135 (using VoIP, PRI or other methods) and then to the PSTN using the QCS's telephony connection.

Figure 8:
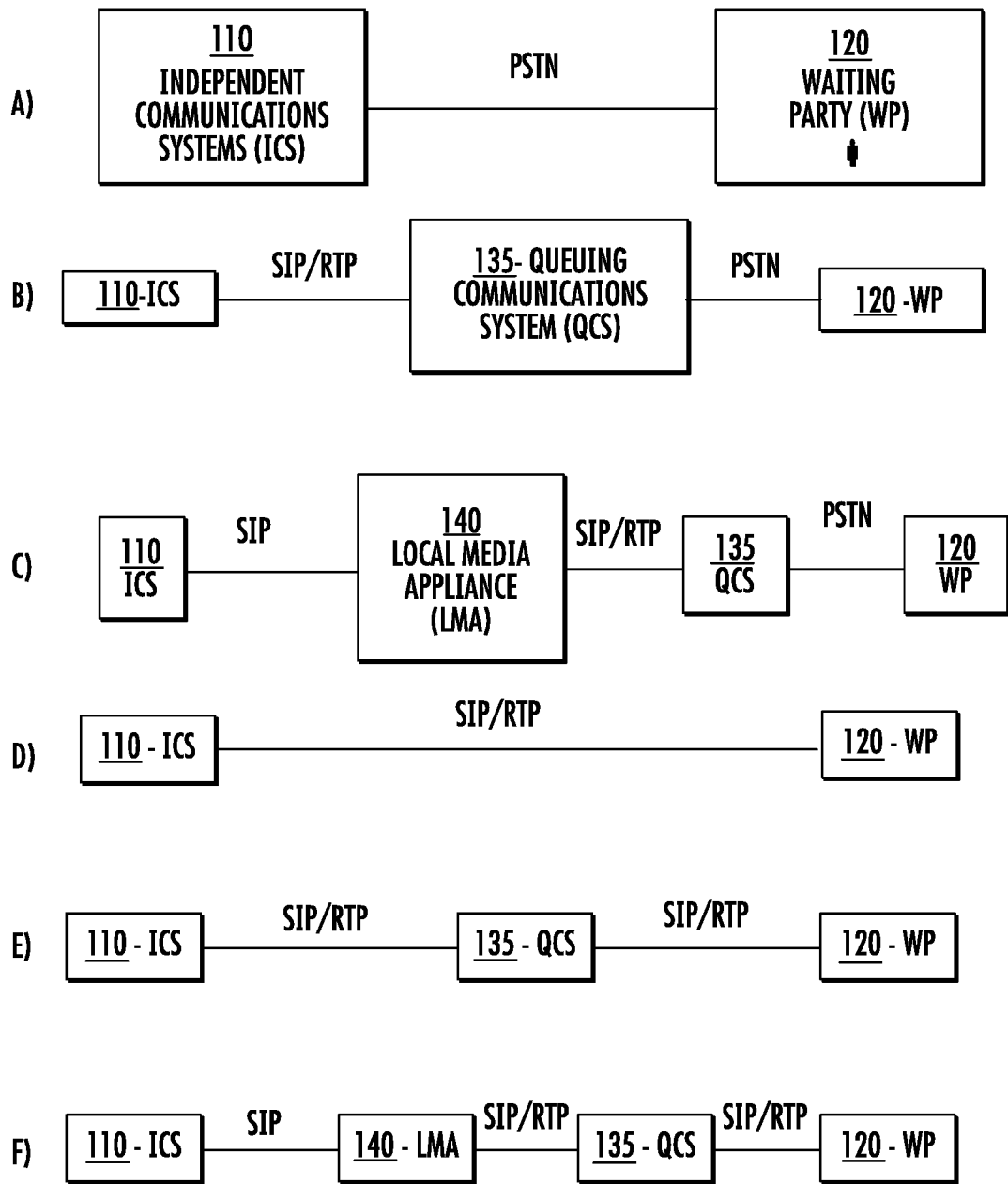
FIG. 8 is an exemplary representation of a connection diagram for phase 3/the Waiting Party leg according to one embodiment (SIP is used here as an illustrative example of a VoIP protocol.

In cases where the Call-Back number is a VoIP address, this call will be initiated from the ICS 110 as:
A) a VoIP call sent from the ICS 110 over the public internet or over a heterogeneous network (e.g. leased line, L2/L2TP, VPN), or other embodiments as
B) a VoIP call sent from the ICS 110 to the QCS 135 and then routed to the public internet, or in other embodiments as
C) a software command to a Local Media Appliance (LMA) which can then connect to the QCS 135 (using VoIP, PRI or other methods) and initiate a VoIP call. See FIG. 8.

In cases where the Call-Back number is a Skype address, or an address for another proprietary communication protocol, this call will be initiated from the ICS 110 to an appropriate gateway for that protocol or from the ICS, via a LMA, and then to the appropriate gateway.

Phase 6: Connection

At this stage, there are two active calls (or legs): the Agent Leg and the waiting party Leg, each comprising a Media and signaling channel. The ICS 110 then "bridges" the two legs, meaning that the calls are connected to one another.

In some embodiments, the ICS 110 remains connected throughout the conversation as a silent party on the call. In other embodiments, the ICS 110 updates the two calls, altering the Media path of both calls to remove the ICS 110 from the Media path.

VoIP Transaction Details

Figure 9:
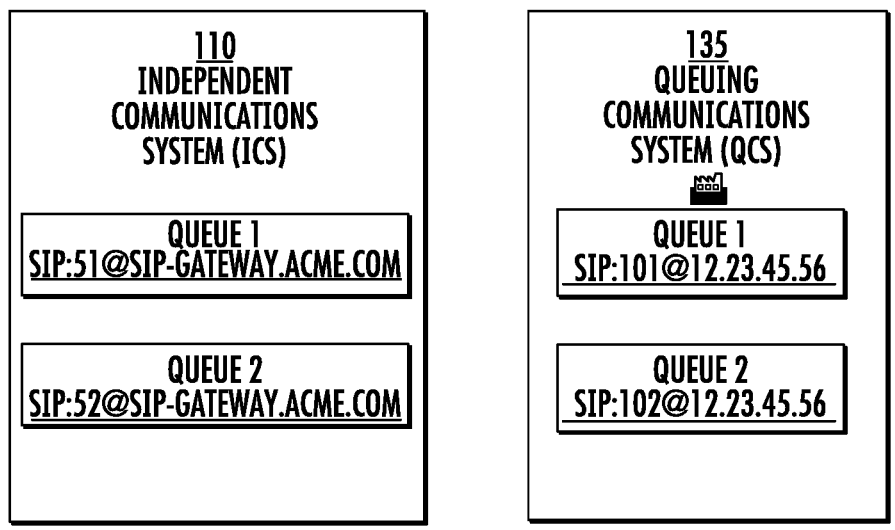
FIG. 9 is an exemplary representation of setting up VoIP addresses according to one embodiment, wherein SIP is used here as a non-limiting example of a VoIP protocol.

In some embodiments, the ICS 110 uses VoIP communication protocols to connect with the QCS. For every Agent Queue that will participate in virtual queuing, one VoIP address is allocated at the QCS 135 and one VoIP address is allocated at the ICS. See FIG. 9.

Figure 10:
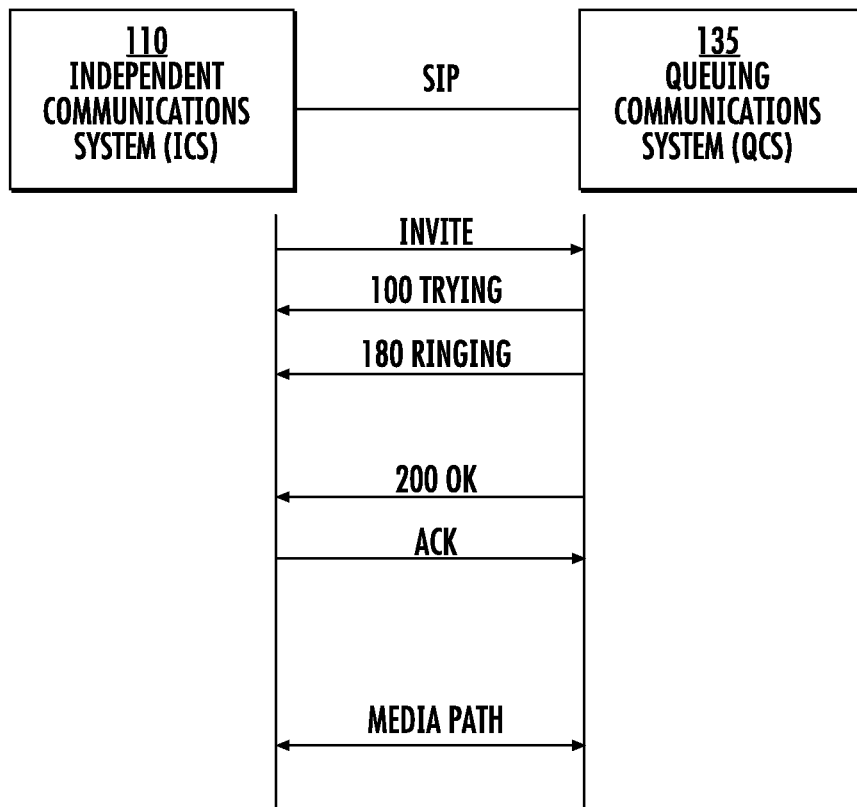
FIG. 10 is an exemplary representation of connections and SIP dialog for phase 1 according to one embodiment, wherein SIP is used here as a non-limiting example of a VoIP protocol.

During Phase 1, the QCS 135 will transfer the call to the appropriate VoIP address on the ICS, using dialog similar to that shown in FIG. 10.

Figure 11:
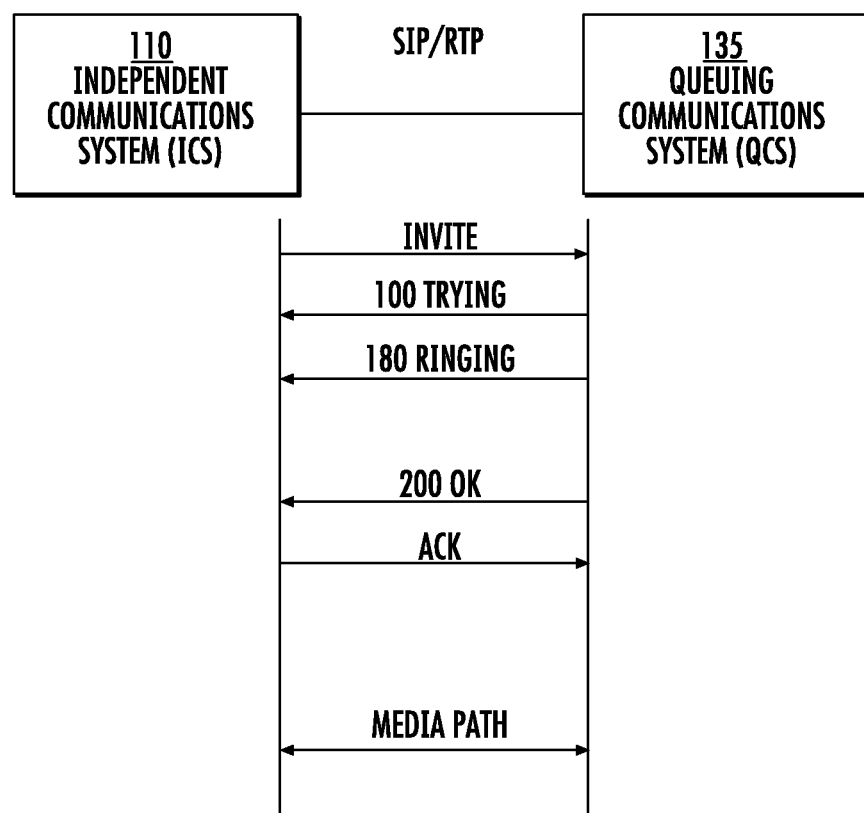
FIG. 11 is an exemplary representation of connections and dialog for phase 3 according to one embodiment, wherein SIP is used here as a non-limiting example of a VoIP protocol.

During Phase 3, the ICS 110 will connect to the appropriate VoIP address on the QCS, using dialog similar to that shown in FIG. 11.

Figure 12:
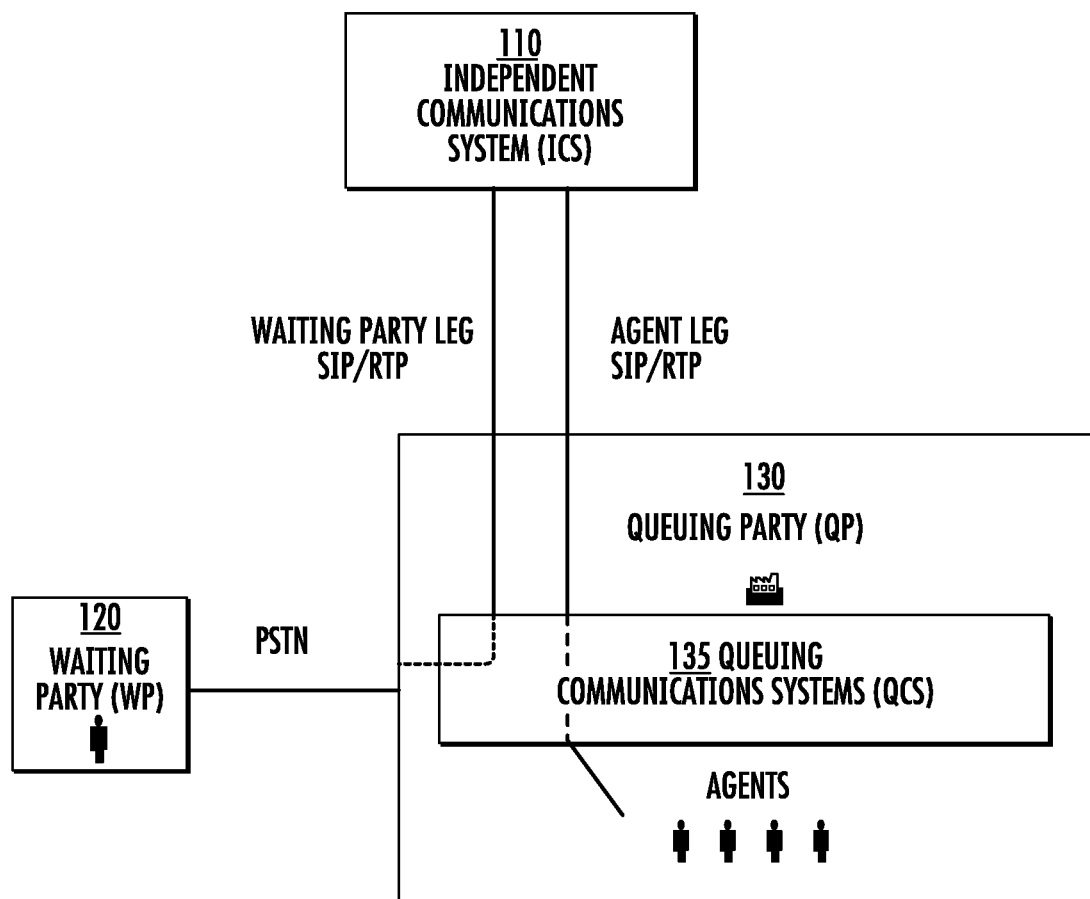
FIG. 12 is an exemplary representation of connections and dialog for phase 5 according to one embodiment, wherein a case is illustrated where the call-back address is a PSTN phone number, and wherein the SIP and RTP are used here as illustrative examples of VoIP protocols.

During Phase 5, the ICS 110 will initiate the waiting party Leg by starting a VoIP call to the QCS 135 which will then make a call to the waiting party 120 using the appropriate protocol for the call-back address given. See FIG. 12.

Figure 13:
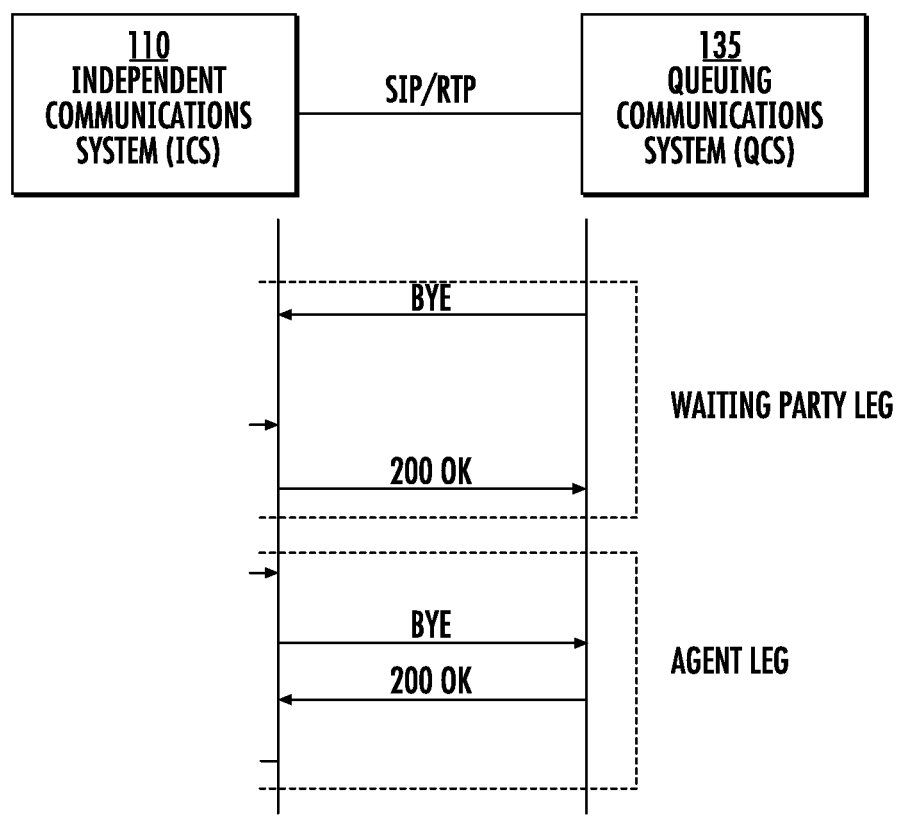
FIG. 13 is an exemplary representation of SIP dialog for the end of the transaction according to one embodiment (SIP is used here as an illustrative example of a VoIP protocol)

The ICS 110 and QCS 135 will disconnect when either party ends the call, using dialog similar to that shown in FIG. 13.

PSTN Transaction Details

In some embodiments, the ICS 110 uses the PSTN (public switched telephone network) to connect with the QCS. For every Agent Queue that will participate in virtual queuing, the QCS 135 can designate a DID exclusively for use by the ICS.

During Phase 1, the QCS 135 will transfer the call to a dedicated DID (Direct Inward Dial) number allocated at the ICS 110 for the QCS.

During Phase 3, the ICS 110 will connect either to a dedicated DID number on the QCS, or to the main DID of the QCS 135 (typically the same toll free number that customers would use). In either case, the ICS 110 may have to navigate through the IVR of the QCS. This can be done through "deep dialing" as described in patent Ser. No. 12/400,932 "System and Method for Externally Mapping an IVR Menu".

During Phase 5, the ICS 110 will initiate the waiting party 120 Leg calling the Voice Call-Back address through the PSTN, or using other methods appropriate for the Voice call-back address given as per Paragraphs 73-75 above.

Maintaining Call-Attached Data

In some cases, during Phase 1, the QCS 135 will gather information from the waiting party 120, such as a Client ID or Case number, via an IVR application. This information is referred to here as "call-attached data". (This information is also sometimes called "CTI Data" or "User-to-User Information" in the industry.) Typically, the QCS 135 will keep this data associated with or "attached to" the call as it moves through the system so that the data can be used to display relevant information on the Agent's screen. (The appearance of such information on the Agent's screen is commonly called a "Screen Pop".) If the call is handed off to an ICS 110 for virtual queuing, as described here, the Call-Attached data will be lost, unless specific arrangements are made.

In some embodiments, the ICS 110 can use VoIP data to maintain the call-attached data. For example, in Phase 1, as per FIG. 10. Above, the call-attached data would be part of the SIP headers (if SIP is being used) in the INVITE request and would be labeled with a Header Field Name such as "User-to-User". Then in Phase 3, as per FIG. 11 above, the call-attached data would then be passed back to the QCS 135 in a similar INVITE request.

In some embodiments, the QCS 135 can pass a limited amount of call-attached data to the ICS 110 over the PSTN using the ANI (Automatic Number Identification) standard. Because the ANI standard was designed to pass along the caller's phone number, there is a limitation on how many digits can be passed. In some embodiments, alternate standards like DNIS and CLI may be used in place of ANI.

In other embodiments, the ANI (or equivalent standard) can be used as a "key" to retrieve the call-attached data from another source. This approach is helpful if the call-attached data requires more digits than allowed in the ANI (or equivalent standard). For example, this can be accomplished by creating a database attached to the QCS 135 that stores key-value pairs where the key is the number passed by ANI (or equivalent standard) and the value is the call-attached data. See FIG. 14.

Figure 14:
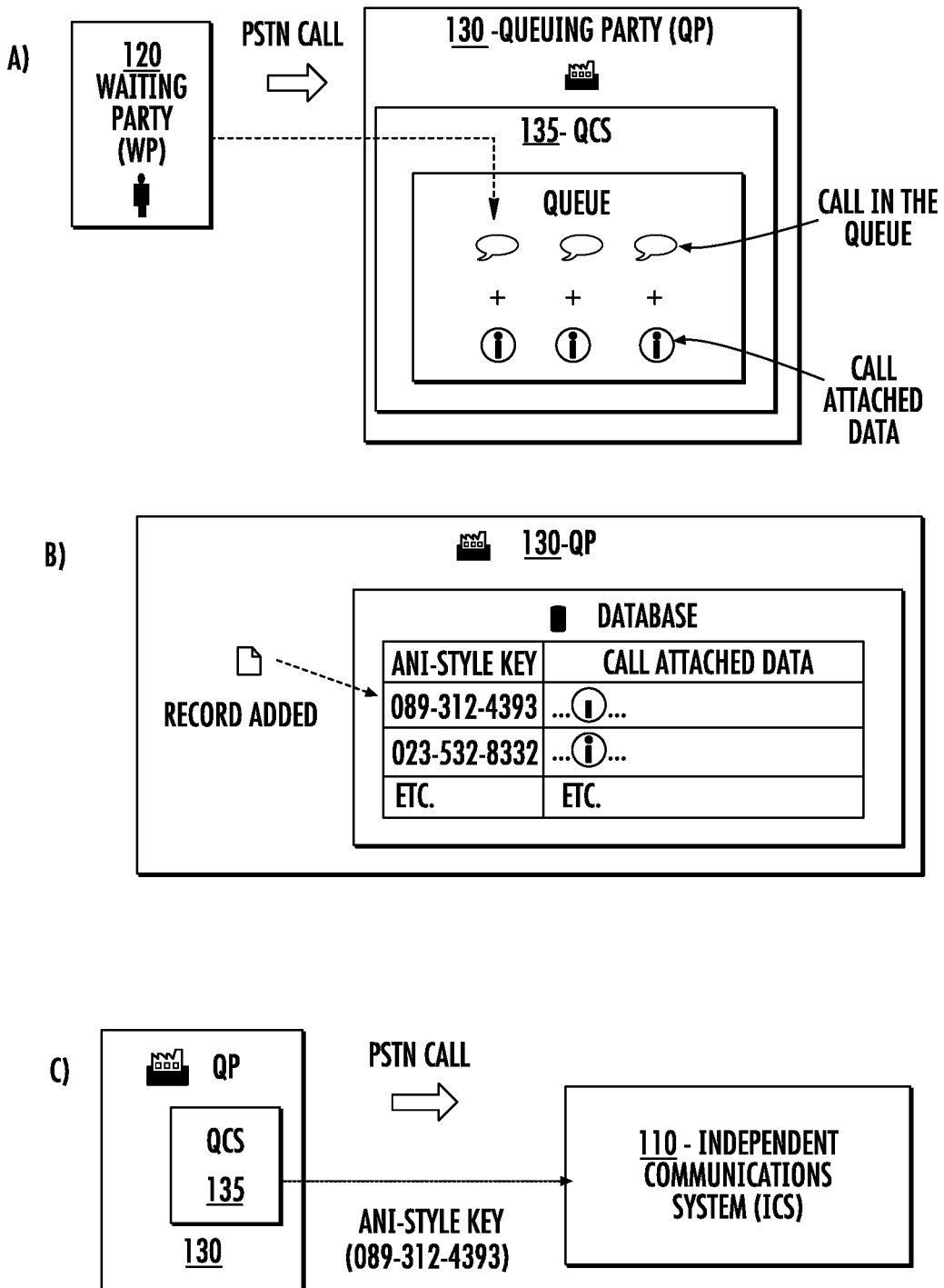
FIG. 14 is an exemplary representation of using automatic number identification (ANI) data as a key for referencing larger call-attached data according to one embodiment.
Figure 14:
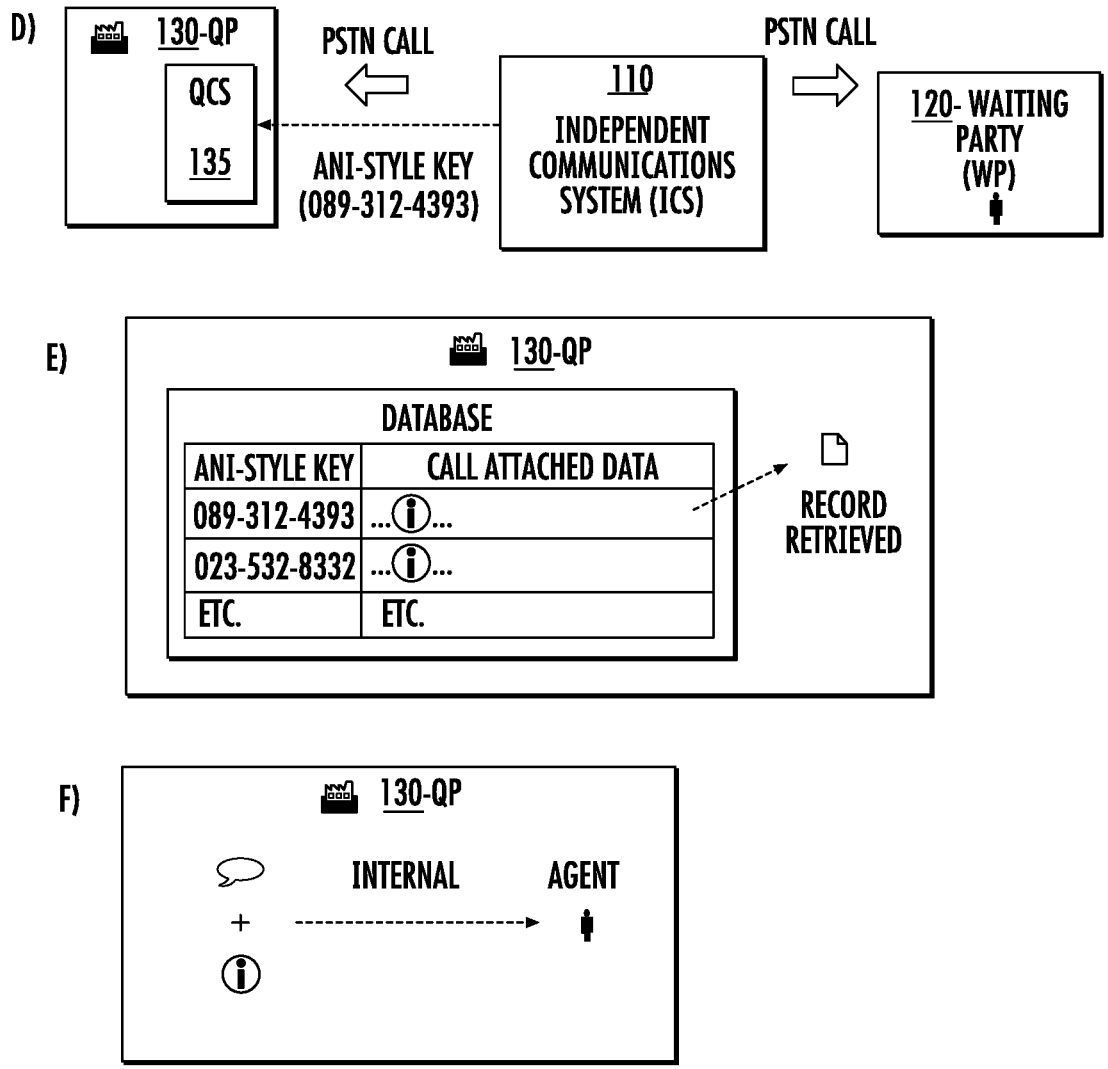

FIG. 14 is an exemplary representation of using the ANI data as a key for referencing larger call-attached data. A PSTN call comes in to the QCS and is added to the internal queue along with call-attached data. (That data may come from the ANI, IVR interactions, etc.) If the caller opts for a call-back, a record is added to a local database that associates the call-attached data with a unique key that meets the specifications of ANI. (ANI is used here as illustrative example of a data format passed along with a phone call.) The call is transferred to the ICS using the ANI-style key. When the agent is ready to take the call, the ICS initiates new PSTN calls to the WP and to the QCS. The call to the QCS uses the key from step Bas its ANI. The QCS uses the database from step B to re-attach the appropriate data to the call. The call and its attached data are then passed to the agent.

In cases where the ANI (or equivalent standard) is used to communicate between the QCS 135 and ICS 110 as a strategy for maintaining call-attached data, an additional step can be taken to increase security. The actual ANI is replaced with a number (the "Temporary Key"), generated at the QCS, and associated temporarily with the actual ANI during that particular transaction. The Temporary Key must conform to the ANI format (or equivalent standard).

In other embodiments, the QCS 135 and ICS 110 can share call-attached data in a manner that is decoupled from the call. For example, the data can be passed via a web service, API, or custom protocols.

Encryption and Security Details

In some embodiments, the ICS 110 communicates with the QCS 135 using secure VoIP protocols (such as SIPS, SRTP, etc.) so that all data passing between the ICS 110 and QCS 135 is encrypted. Thus, anyone attempting to intercept data that travels between the ICS 110 and QCS 135 would not be able to extract the Media content or other meaningful information.

Local Media Appliance Details

Figure 15:
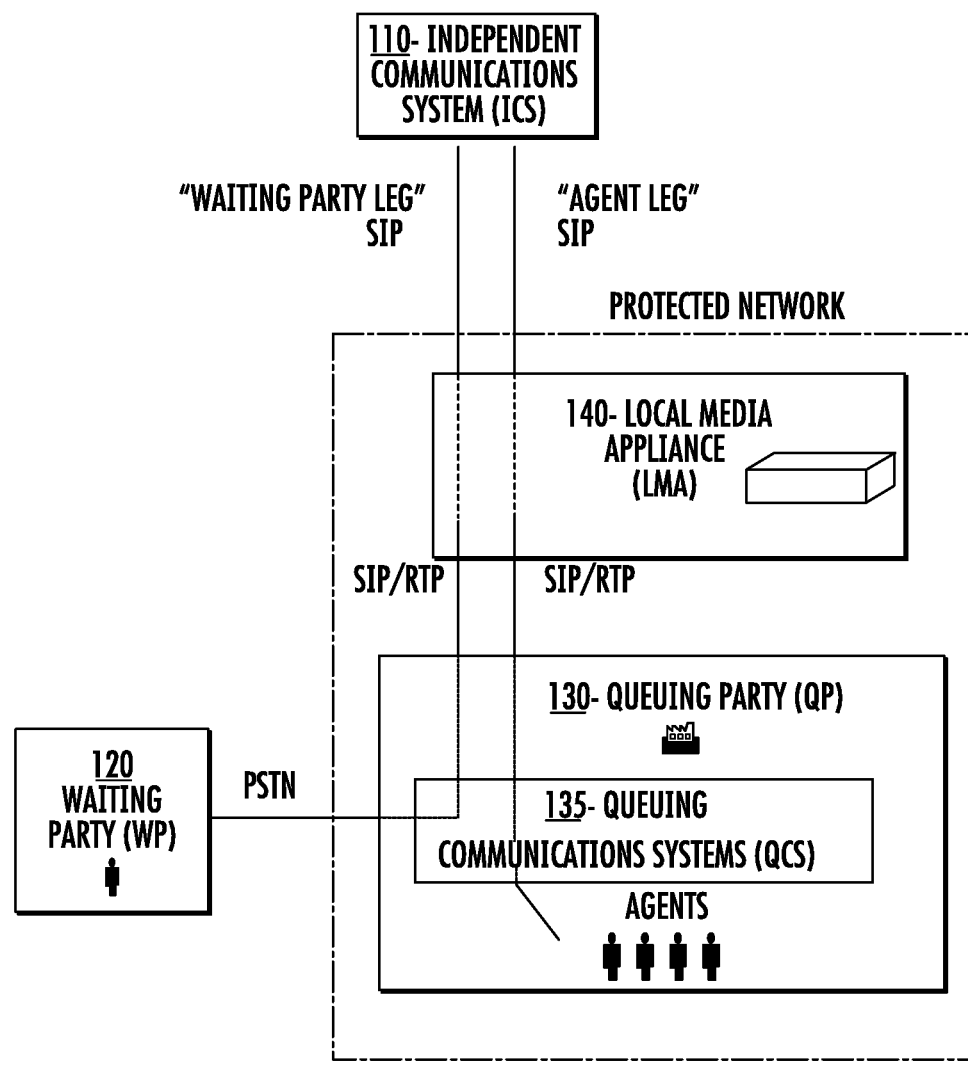
FIG. 15 is an exemplary representation of a Local media Appliance (LMA), wherein SIP and RTP are used here as illustrative examples of VoIP protocols according to one embodiment.

In some embodiments presented herein, calls are routed via a local media appliance (LMA), which is a hardware or software apparatus with a protected connection to the QCS. (For example, the LMA 140 and QCS 135 could be on the same local network, or connected by secure VPN.) The LMA 140 sends and receives signaling and media data between the QCS 135 and ICS 110 (typically via the TCP or UDP protocols). See FIG. 15.

Figure 16:
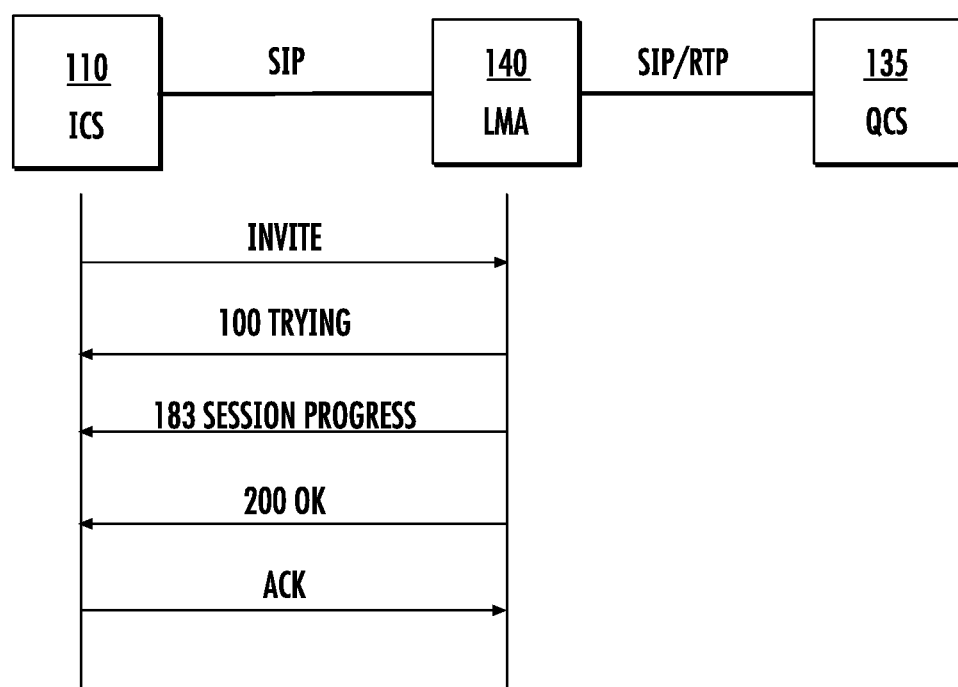
FIG. 16 is an exemplary representation of connections and SIP dialog for Phase 1 with an LMA according to one embodiment, wherein SIP and RTP are used here as non-limiting examples VoIP protocols.
Figure 17:
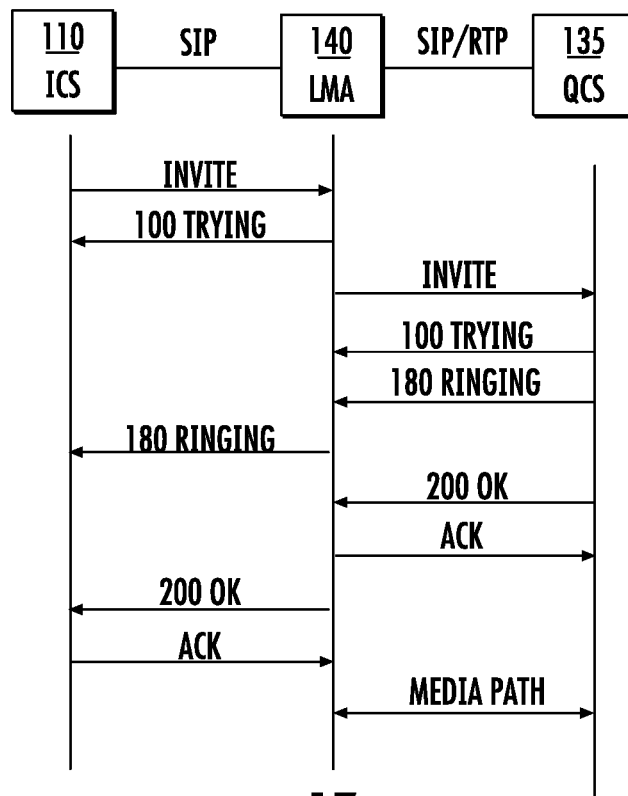
FIG. 17 is an exemplary representation of connections and SIP dialog for phase 3 with the LMA according to one embodiment, wherein SIP and RTP are used here as non-limiting examples VoIP protocols.

During Phase 1, the QCS 135 will transfer the call to the LMA 140 (for example to a VoIP address or a PRI extension), as shown in FIG. 16.

During Phase 3, the ICS 110 will communicate with the LMA 140 using VoIP protocols. Then the LMA 140 will communicate with the QCS 135 using VoIP protocols or PRI. This transaction is shown in FIG. 16.

Figure 18:
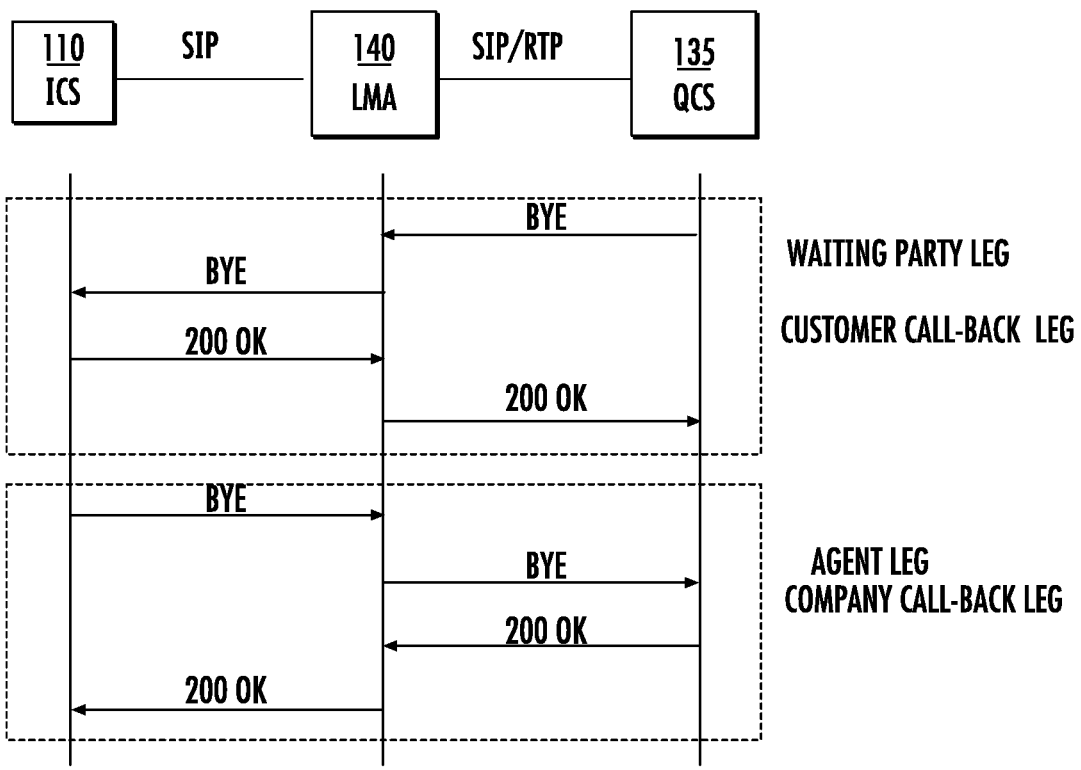
FIG. 18 is an exemplary representation of SIP dialog for the end of the transaction with the LMA according to one embodiment, wherein SIP and RTP are used here as illustrative examples of VoIP protocols.

The ICS, QCS 135 and LMA 140 will disconnect when either party disconnects, as shown in FIG. 18.

The advantages of the LMA 140 include A) allowing the ICS 110 to provide virtual queuing functionality to the QCS 135 without requiring any "sensitive" media to go between the QCS 135 and ICS 110. In this case, "sensitive" media means any data going to or from the waiting party 120 and which typically appears during Phase 6. Many industries (for example financial and healthcare) have regulations that require a high level of security for such data. In some cases, even encryption of the sensitive media (as described above) is not sufficient to satisfy security requirements. By using an LMA, the queuing party 130 can be certain there is no risk of the sensitive media being intercepted because that Media never leaves protected network of the LMA. Other, non-sensitive media may travel between the QCS 135 and ICS 110 without security concerns. For example, the media during Phase 3 includes what a person would hear while waiting on hold with the queuing party 130 (typically "hold music"). B) reducing bandwidth requirements between the ICS 110 and QCS; and C) reducing latency between the ICS 110 and QCS 135 (because the LMA 140 is typically close to the QCS 135 from a network perspective), which helps maintain high Media quality.

Reporting Status to Waiting Party

Figure 19:
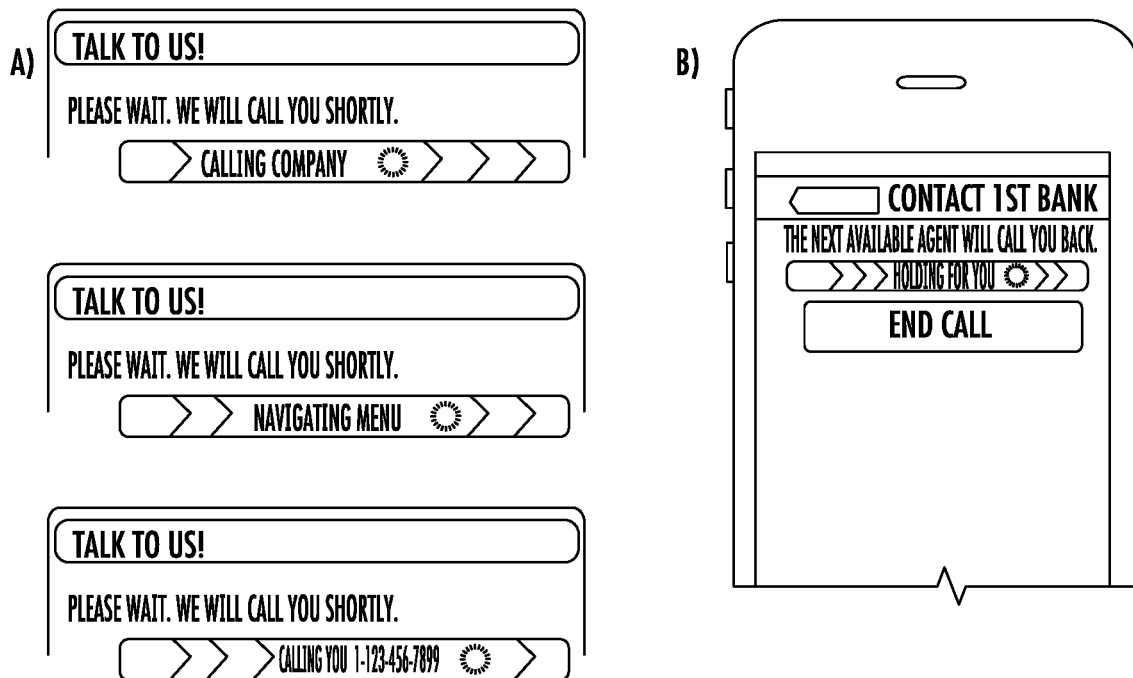
FIG. 19 is an exemplary representation of interface used by the Waiting Party to see call-back status according to one embodiment.

In some embodiments, the ICS 110 interacts with the waiting party 120 using a visual interface via a website or mobile application. In these embodiments, the ICS 110 can report to the waiting party 120 the status of the request for a call-back. The data reported may include the state (which may indicate, for example, which phase of the process is current), the time spent on hold so far or the average hold time for the queuing party 130 in question. See FIG. 19.

Collecting Aggregate Statistics

As the ICS 110 is used by many waiting Parties over many days, it is possible for aggregate statistics to be collected about the average hold time for the queuing party 130 and how it varies based on time of day, day of the week, or time of the year. In some embodiments, the ICS 110 could use this information to report to the waiting party 120 the Estimated waiting Time (EWT) to reach an Agent. In some embodiments, the ICS 110 could advise the waiting party 120 when to schedule a call for such that the waiting time is shortest.

Advanced Scheduling

Figure 20:
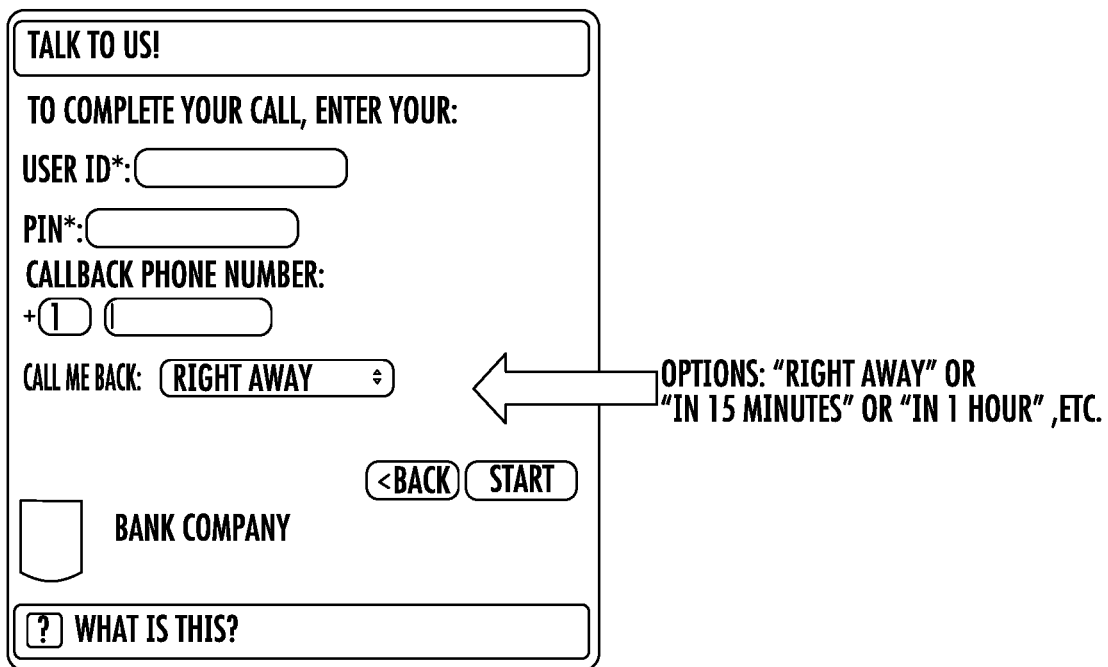
FIG. 20 is an exemplary representation of interface used by the Waiting Party to schedule a call-back in advance according to one embodiment.

In some embodiments, the ICS 110 can allow the waiting party 120 to schedule a call to a queuing party 130 in advance. The advantage of this to the queuing party 130 is that it can help to distribute demand for its Agents throughout the day. The advantage of this to the waiting party 120 is that the call-back can be set up to correspond with a convenient time. See FIG. 20.

Redirecting Calls

Figure 21:
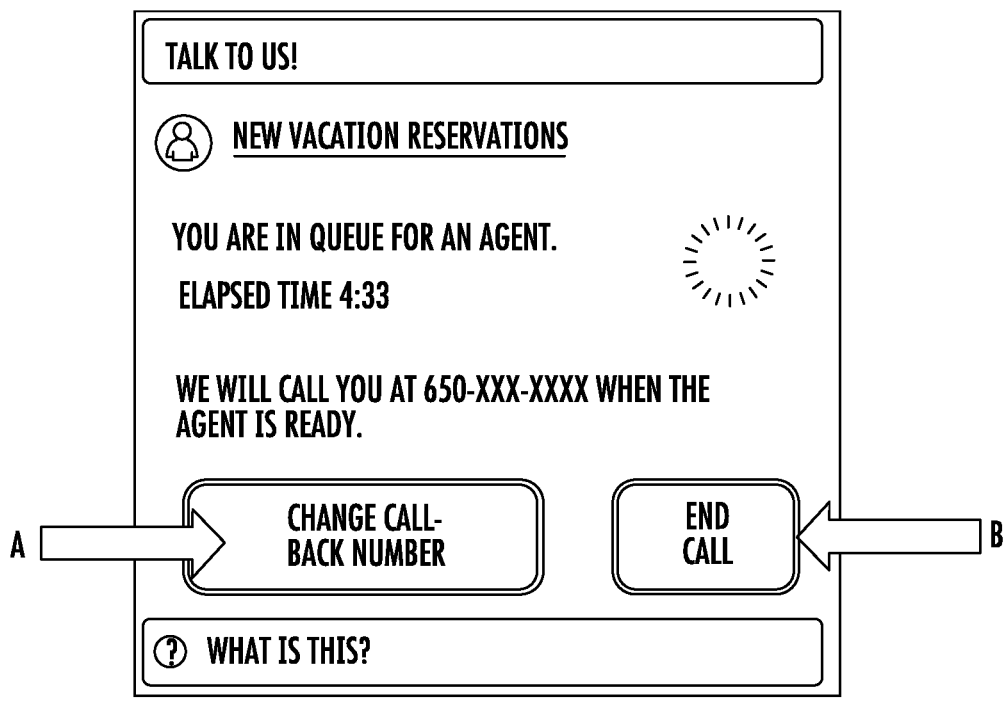
FIG. 21 is an exemplary representation of interface used by the Waiting Party to change call-back address or cancel according to one embodiment.

In some embodiments, the ICS 110 can allow the waiting party 120 to change the call-back address after the call request has been made. The advantage of this is it gives the waiting party 120 more flexibility while waiting for the Call-Back, thus further reducing the frustration of waiting for an agent. See FIG. 21*a*.

In some embodiments, the ICS 110 can allow the waiting party 120 to reschedule the call for a later time or date.

In some embodiments, the ICS 110 can allow the agent to redirect the call. For example, prior to accepting the call, an Agent may choose to redirect the call to an alternate queue, or an alternate communication channel.

In some embodiments, the ICS 110 can allow the Agent to reschedule the call for a later time or date.

The Waiting Party Can Cancel Call

In some embodiments, the ICS 110 can allow the waiting party 120 to cancel the call after the call request has been made. The advantage of this is it means a position won't be held in the Agent Queue for waiting party 120 that no longer wants it or needs it, thus making more efficient use of resources. See FIG. 21*b*.

Although the invention has been described relative to various selected embodiments herein presented by way of example, there are numerous variations and modifications that will be readily apparent to those skilled in the art in light of the above teachings. It is therefore to be understood that, within the scope of the claims hereto attached and supported by this specification, the invention may be practiced other than as specifically described.

What is claimed is:

1. A method comprising:
receiving a call, from a waiting party, at an organization that utilizes a queuing calling system (QCS) to create a queue to talk to an agent of the organization;
transferring the call in progress, without participation by the waiting party, to an independent calling system (ICS), a third party not operated by the organization, between the waiting party and the queuing party on a voice line for a transaction, and transferring call-attached data comprising data about the transaction or the waiting party from the QCS to the ICS using a data line;
terminating, by the ICS, the call between the waiting party and the queuing party based on a decision from the waiting party to receive a call-back, rather than wait on hold;
initiating an agent leg call from the ICS to the QCS to hold a virtual spot for the waiting party;
detecting at the ICS that an agent at the QCS is available;
initiating, by the ICS, a waiting party leg call between the waiting party and the QCS;
bridging the waiting party leg call and the agent leg call to create a voice line connection between the waiting party and the QCS; and
transferring call-attached data back to the QCS over the data line.

2. The method of claim 1, wherein the system independent calling system (ICS) is cloud based such that the queuing party does not need hardware or software at the queuing party to implement the method.

3. The method of claim 1, wherein the call from a waiting party is on a PSTN line, and the communication between the independent calling system (ICS) and the queuing party is at least partially on a data line.

4. The method of claim 3, wherein the data line is one of a VoIP, Internet, Intranet, WAN, and LAN.

5. The method of claim 1, wherein the user attached data is encrypted in transport.

6. The method of claim 5, wherein the user attached data is encrypted with different levels of sensitivity at different states of transaction.

7. The method of claim 1, wherein the waiting party is prompted to choose a call-back time.

8. The method of claim 1, wherein the call-back is scheduled according to resources.

9. The method of claim 1, wherein the waiting party is allowed to change a call-back address or reschedule a call-back.

10. The method of claim 1, wherein the independent calling system (ICS) chooses a call-back address based on a profile of the waiting party.

11. The method of claim 1, wherein the independent calling system (ICS) communicates with a local media appliance (LMA) at the queuing party.

12. A queuing system comprising:
a queuing calling system (QCS) for an organization to create a queue to talk to an agent of the organization;
a waiting party calling system configured to communicate with the QCS, during a call from a waiting party to a queuing party on a voice line for a transaction;
an independent calling system (ICS)), a third party not operated by the organization, to receive the call, in progress, between the waiting party and the queuing party on a voice line for a transaction without participation by the waiting party, to receive call-attached data comprising data about the transaction or the waiting party from the QCS using a data line; to terminate the call between the waiting party and the queuing party based on a decision from the waiting party to receive a call-back, rather than wait on hold, to initiate an agent leg call from the ICS to the QCS to hold a virtual spot for the waiting party; to detect that the transaction can be processed at the QCS; to initiate a waiting party leg call between the waiting party and the QCS, to bridge the waiting party leg call and the agent leg call, to create a voice line connection between the waiting party and the QCS, and to transfer call-attached data back to the QCS over the data line.

13. The queuing system of claim 12, wherein the independent calling system (ICS) is cloud based system such that the queuing party does not need hardware or software at the independent calling system (ICS) to use the system.

14. The queuing system of claim 12, wherein the call from a waiting party is on a PSTN line, and the communication between the independent calling system (ICS) and the queuing party is at least partially on a data line.

15. The queuing system of claim 14, wherein the data line is one of a VoIP, Internet, Intranet, WAN, and LAN.

16. The queuing system of claim 12, wherein the user attached data is encrypted in transport.

17. The queuing system of claim 16, wherein the user attached data is encrypted with different levels of sensitivity at different states of transaction.

18. The queuing system of claim 12, wherein the waiting party is prompted to choose a call-back time.

19. The queuing system of claim 12, wherein the call-back is scheduled according to resources.

20. The queuing system of claim 12, wherein the waiting party is allowed to change a call-back address or reschedule a call-back.

21. The queuing system of claim 12, wherein the queuing system chooses a call-back address based on a profile of the waiting party.

22. The queuing system of claim 12, wherein the independent calling system (ICS) communicates with a local media appliance (LMA) at the queuing party.

23. The method of claim 1, wherein the user attached data comprises a call-back address.

24. The method of claim 1, wherein the user attached data comprises an ID number or a reference number.

25. The method of claim 1, wherein the user attached data comprises one or more of geolocation data, contextual information, IP address, Mobile Device ID, IMEI, and a browser cookie.

26. The method of claim 1, wherein facilitating, by the queuing party, the call back with the waiting party with the user attached data comprises generating one of an agent prompt, agent whisper or a screen pop.

* * * * *